United States Patent [19]
Herman

[11] 3,793,909
[45] Feb. 26, 1974

[54] TRANSMISSION

[75] Inventor: Stanley W. Herman, Indianapolis, Ind.

[73] Assignee: General Motors Corporation, Detroit, Mich.

[22] Filed: Oct. 8, 1971

[21] Appl. No.: 187,816

Related U.S. Application Data

[63] Continuation of Ser. No. 883,203, Dec. 8, 1969, abandoned.

[52] U.S. Cl. ................................................ 74/759
[51] Int. Cl. .......................... F16h 3/44, F16h 57/10
[58] Field of Search ..... 24/758, 759, 764, 765, 753, 24/677

[56] References Cited
UNITED STATES PATENTS

| | | | |
|---|---|---|---|
| 2,324,713 | 7/1943 | McFarland | 74/765 X |
| 2,350,810 | 6/1944 | Pentz | 74/677 |
| 2,519,022 | 8/1950 | Burtnett | 74/688 |
| 3,296,891 | 1/1967 | Tuck | 74/677 |
| 3,705,521 | 12/1972 | Smith | 74/759 |
| 1,870,076 | 8/1932 | Thomson | 74/765 X |
| 2,433,052 | 12/1947 | Kelley | 74/765 X |
| 2,856,794 | 10/1958 | Simpson | 74/732 X |
| 3,067,632 | 12/1962 | Foerster et al. | 74/759 |
| 3,234,820 | 2/1966 | Tuck et al. | 74/765 X |

FOREIGN PATENTS OR APPLICATIONS

| | | | |
|---|---|---|---|
| 63,940 | 5/1955 | France | 74/759 |

*Primary Examiner*—Leonard H. Gerin
*Attorney, Agent, or Firm*—John P. Moran

[57] ABSTRACT

A transmission providing three (3) forward and two (2) reverse speed ratios, including a torque converter unit, input and output shafts, three planetary gear sets, a brake operatively connected to the ring gear of each gear set, interconnecting carriers and connector members, and a pair of disc-type clutches, the driving discs of both clutches being actuated by the torque converter output, with the driven discs of one clutch being connected to an input shaft on which the sun gears of two of the gear sets are mounted, and the driven discs of the other clutch being connected to the ring gear of one of the two aforementioned gear sets, the various speed ratios being determined by selective engagement of the brakes and clutches.

5 Claims, 2 Drawing Figures

PATENTED FEB 26 1974

3,793,909

| SPEED | CLUTCHES | | BRAKES | | |
|---|---|---|---|---|---|
| | 20 | 22 | 30 | 32 | 34 |
| FIRST | ENGAGED | | | ENGAGED | |
| SECOND | ENGAGED | | ENGAGED | | |
| THIRD | ENGAGED | ENGAGED | | | |
| LOW SPEED REVERSE | ENGAGED | | | | ENGAGED |
| HIGH SPEED REVERSE | | ENGAGED | | ENGAGED | |

INVENTOR.
Stanley W. Herman
BY
John P. Moran
ATTORNEY and 3,793,909

TRANSMISSION

This application is a continuation of application Ser. No. 883,203, filed Dec. 8, 1969, now abandoned.

This invention relates to multiratio transmissions and, more particularly, to a transmission having three forward speeds and two reverse speeds and being especially well suited for use in track-laying vehicles.

Where there is a need, such as on military track-laying vehicles, it is advantageous for a multiratio transmission to include, in addition to the usual three forward and one reverse input/output speed ratios, provisions for an additional faster reverse speed.

Accordingly, it is a general object of the invention to provide an improved transmission employing sufficient gear sets, brakes and clutches to provide the above-mentioned faster reverse speed selection, along with three forward speeds and the usual reverse speed.

It is another object of the invention to provide the additional faster reverse speed characteristic with minimal additions and/or changes on a conventional three forward- and single reverse-speed transmission.

It is a more specific object of the invention to provide the additional faster reverse speed feature without adding additional planetary gear sets or altering the existing gear sets and the accompanying brakes of a conventional transmission similar to that illustrated and described in U.S. Pat. No. 1,404,675, issued in the name of W. G. Wilson on Jan. 24, 1922, but rather, to provide the additional faster reverse speed characteristic by modifying the usual clutch arrangement associated therewith.

It is a still more specific object of the invention to provide the additional faster reverse speed feature by varying the prior art clutch arrangement and coordinating said clutch arrangement with the existing transmission planetary gear components.

These and other objects and advantages of the invention will become more apparent when reference is made to the following description and accompanying drawing, wherein.

Figures 1, 2:
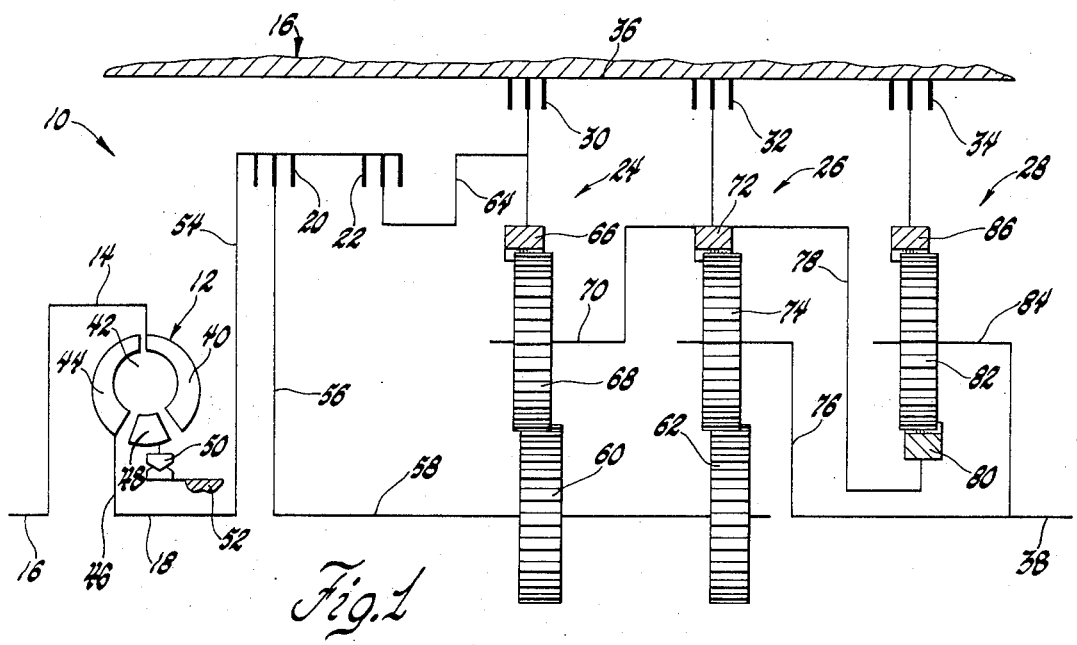
FIG. 1 is a schematic diagram of a transmission embodying the invention.
FIG. 2 is a table showing the various pairs of controllable friction devices which are engaged to effectuate the different drive ratios available in the transmission illustrated in FIG. 1.

Referring to the drawings in greater detail, FIG. 1 illustrates a transmission 10, including generally a torque converter unit 12 mounted in a torque converter housing, represented at 14; an input shaft 16 to the torque converter unit 12; an output shaft 18 from the torque converter unit 12; first and second disc-type clutches 20 and 22; first, second and third planetary gear units 24, 26 and 28, respectively, each having an associated brake 30, 32 and 34, respectively, mounted in a transmission housing, represented generally at 36; and an output shaft 38.

More specifically, the input or engine shaft 16 is connected to a torque converter impeller 40 which pumps fluid around the torus chamber 42 of the torque converter unit 12 to a turbine 44 where the fluid acts on the turbine blades to drive the turbine 44 which is connected through a hub 46 to the torque converter output shaft 18. The fluid in the torus chamber 42 is redirected to the impeller 40 in the usual manner by a stator 48 which is connected through a one-way brake device 50 to a wall 52 of the torque converter housing 14.

A hub 54 is secured to and extends from the torque converter output shaft 18 to the first and second ratio-engaging clutches 20 and 22, respectively, A hub 56 serves to connect the driven discs of the first clutch 20 to a shaft 58. First and second sun gears 60 and 62, respectively, are mounted on the shaft 58 for rotation therewith. A connector element 64 connects the driven discs of the second clutch 22 to a first ring gear 66 which is operatively connected to the first brake 30 mounted in the transmission housing 36.

The first sun gear 60 meshes with a first planetary pinion gear 68 rotatably mounted on spindles (not shown) in a first carrier 70 which connects between the first planetary pinion gear 68 and a second ring gear 72. The first planetary pinion gear 68 also meshes with the first ring gear 66. The second ring gear 72 is operatively connected to the second brake 32 and meshes with a second planetary pinion gear 74. The second planetary pinion gear 74 meshes with the second sun gear 62 and is rotatably mounted on spindles (not shown) in a second carrier 76 which is connected to the transmission output shaft 38. A connector or flange member 78 connects between the second ring gear 72 and a third sun gear 80. The third sun gear 80 meshes with a third planetary pinion gear 82 which is rotatably mounted on spindles (not shown) in a third carrier 84. The third planetary pinion gear 82 meshes with a third ring gear 86 which is operatively connected to the third brake 34. The third carrier 84 is secured to the transmission output shaft 38.

It should be understood that each pinion gear 68, 74 and 82 illustrated in FIG. 1 represents a multiple number of such pinions in each carrier 70, 76 and 84, with each pinion gear being rotatably mounted on a like multiple number of spindles fixed in the respective carriers, the number depending upon various factors, such as space and load requirements.

OPERATION

The diagrammatic tabulation of FIG. 2, illustrating the engagement of the various clutches and brakes for the respective forward and reverse speeds, is believed helpful in understanding the operation of the transmission in accordance with the present invention.

For each of the following operations, we shall consider a clockwise rotation, as viewed from the input end, of the torque converter output shaft 18 by the torque converter turbine 44 output, the shaft 18 serving as the input to alternate discs of each of the first and second clutches 20 and 22.

FIRST SPEED

As indicated in FIG. 2, for FIRST SPEED the first clutch 20 and the second brake 32 are engaged by means of a suitable control system (not shown). The shaft 58 will be rotated by virtue of the engagement of the first clutch 20 and the rotation thereby of the hub 56, which is secured to the shaft 58. Rotation of the shaft 58 will cause the interconnected sun gears 60 and 62 to rotate in a clockwise direction. The second ring gear 72 is held stationary by the engaged second brake 32. This, in turn, through the first carrier 70, will prevent the spindle of the first pinion gear 68 from rotating about the axis of the shaft 58, and, through the flange member 78, will also prevent the third sun gear 80 from rotating. The clockwise rotation of the second sun gear 62 will cause the second pinion gear 74 to "walk around" inside the locked second ring gear 72 and thereby cause the spindles of the second carrier 76 to carry the second carrier 76 and the connected transmission output shaft 38 in a clockwise or forward direction at a predetermined first or low-speed gear ratio.

SECOND SPEED

For SECOND SPEED, the first clutch 20 remains engaged, and the second brake 32 is disengaged and the first brake 30 engaged by means of the control system. Again, the first and second sun gears 60 and 62 will be rotated by the shaft 58 in a clockwise direction, causing the first pinion gear 68 to walk around inside the first ring gear 66 which is locked up or grounded by the first brake 30. The resultant rotation of the first carrier 70 about the axis of the shaft 58 causes the second ring gear 72 to rotate in a clockwise direction. As in first speed drive, the rotation of the second sun gear 62 causes the second planetary pinion gear 74 to walk around inside the second ring gear 72; however, the above-described clockwise rotation of the second ring gear 72 adds to the speed of the orbiting second carrier 76. Thus the connected output shaft 38 is caused to rotate at some speed intermediate the lower speed in "low" and the higher, or 1:1 speed, in "high." This second or intermediate speed is determined by the gearing selected for the first and second planetary gear sets 24 and 26.

The third pinion gear 82 will simply be rotated around the third sun gear 80 by the output shaft 38, through the third carrier 84, the third ring gear 86 being free.

THIRD SPEED

In THIRD SPEED, all of the brakes 30, 32 and 34 are released, and both clutches 20 and 22 are engaged by means of the control system. This serves to lock the first sun gear 60 to the first ring gear 66, effecting the locking of the first carrier 70 therebetween, as well as effecting the locking of the second ring gear 72 to the second sun gear 62 and the locking of the second carrier 76 therebetween. Thus, the input shaft or torque converter output shaft 18 is locked to the transmission output shaft 38 for 1:1 ratio by the conjoint locking of both planetary gear units 24 and 26.

LOW SPEED REVERSE

By means of the control system, the clutch 22 and the brakes 30 and 32 are released while the clutch 20 and the brakes 34 are engaged. The clutch 20 provides a 1:1 forward drive from the input shaft 18 to the sun gears 60 and 62. The rotation of the first sun gear 60 tends to rotate the planet pinion gear 68 backwardly about its spindle in the first carrier 70, causing the first ring gear 66 to rotate backwardly. However, neither the brake 30 nor the clutch 22 are engaged, and the first ring gear 66 is free to rotate. Thus the first planetary gear unit 24 has no drive function in low speed reverse drive. The input drive of the second sun gear 62 tends to drive the second carrier 76 forward; however, the reaction for this forward drive of the second carrier 76 on the second ring gear 72 is such that the drive transmitted therefrom through the flange member 78 to the third sun gear 80 is in the multiplied-reverse direction. The drive is again multiplied in the third planetary unit 28 by virtue of the third ring gear 86 being grounded. The total negative drive thus provided to the third carrier 84 is greater than the positive drive provided to the second carrier 76. Accordingly, since both carriers 76 and 84 are connected to the output shaft 38, the latter is driven in the resultant negative direction at a predetermined speed ratio, as determined by the algebraic sum of the two inputs from the carriers 76 and 84.

HIGH SPEED REVERSE

For HIGH SPEED REVERSE, the control system provides for the release of the first clutch 20 and the brakes 30 and 34, while the second clutch 22 and the brake 32 are engaged. Thus, only the first ring gear 66 receives input drive from the turbine output shaft 18. The first carrier 70 of the first planetary gear set 24 and the spindles for the pinion gear 68 are locked by the brake 32. The forward input drive of the ring gear 66 rotates the planetary pinion gear 68 forwardly about its locked spindle producing reverse, and increased speed drive, to the sun gears 60 and 62. The third planetary gear unit 26 is conditioned for reduced drive as in first speed drive; however, it receives the above-described reversed speed increased drive from the second sun gear 62. Accordingly, the drive is reverse, and the ratio of drive is the product of the overdrive in the first planetary gear unit 24 and the underdrive in the second planetary gear unit 26, with the product being speed reduction of lesser value than that achieved in the LOW SPEED REVERSE operation. Since the third ring gear 86 is free, the third pinion gear 82 will be freely rotated by the third carrier 84 between the third ring gear 86 and the locked third sun gear 80, the latter being locked by the flange member 78 from the locked second ring gear 72.

REVERSE SPEED RATIOS

For a comparison of the drive ratios of the low and high reverse speed arrangements, assume, for example, that the number of teeth, "S," formed on each sun gear 60, 62 and 80 is thirty, the number of teeth, "R," formed on each ring gear 66, 72 and 86 is sixty.

For LOW SPEED REVERSE, the second planetary gear set 26 receives a unit of torque from the second sun gear 62. By the precepts of planetary systems, the unit torque is transferred to the second planet pinion gear 74, which reacts on the spindle of the second planet carrier 76, producing $+R+S/S$ or $+60+30/30$ or $+3$ units of torque in the second carrier 76, while producing $-R/S$ or $-60/30$ or $-2$ units of torque in the second ring gear 72. The third sun gear 80, being directly connected to the second ring gear 72, thus receives $-2$ units of torque. The third planetary gear set 28, having the third ring gear 86 grounded by the brake 34, multiplies the $-2$ units of sun gear torque by the ratio of $+R+S/S$ or $+90/30$ or $+3$, and delivers $-2 \times (+3)$ or $-6$ units of torque to the third carrier 84. Since the carriers 76 and 84 are connected to the output shaft 38, the output shaft 38 receives the algebraic summation of the units of torque, i.e., $+3$ torques from the second carrier 76 plus $(-6)$ units of torque from the third carrier 84, or $-3$ units of torque to the output shaft 38. Thus, for one unit of input torque received at the input shaft 18, there is delivered to the output shaft 38 $-3$ units of torque. Since the speed ratio is directly inverse to the torque ratio, for one rotation of the input shaft 18 the output shaft 38 is caused to rotate —⅔ times. In general terms, where the speed ratio of a transmission is considered as $^N18/N_{38}$, where $N$ is RPM and the subscripts 18 and 38 represent the shafts 18 and 38, respectively, the speed reduction ratio of the drive is, accordingly, $+1/-1/3$ or $-3/1$ for LOW SPEED REVERSE drive.

For HIGH SPEED REVERSE, as a result of the second ring gear 72 being locked by the clutch 32, the connected first carrier 70 and the spindles of the first pinion gear 68 are also locked. The forward input drive from the turbine output shaft 18, through the clutch 22 drives the first ring gear 66 forwardly at 1:1 ratio. This forward drive is transmitted through the first planetary pinion gear 68 which reacts on its grounded spindle to act as a simple three-gear-type reversing-speed increasing drive to the first sun gear 60. In this illustration one plus (1+) rotation of the input causes $1 \times (-R/S) = -60/30 = -2$ rotations of the first sun gear 60, and the connected second sun gear 62. As in first speed forward, the second planetary pinion gear set 26 has a locked ring gear 72, with the second sun gear 62 input and the second carrier 76 output providing that for one rotation of the second sun gear 62 the output will be rotated $S/R+S$ or 30/90 or 1/3 times. Thus, in summary, for one rotation of the turbine output shaft 18, the first sun gear 60 and second sun gear 62 rotate —2 times, causing the output shaft 38 to rotate $-2 \times 1/3$ or $-2/3$ times. Thus, the speed ratio $^N18/N_{38}$ becomes $+1/2/3$ or $-3/2$ or $-1\frac{1}{2}/1$ or, said another way, for one forward rotation of the input shaft 18, the output shaft 38 will be caused to rotate ⅔ times backwardly for HIGH SPEED REVERSE drive.

It should be apparent that the invention provides an improved transmission wherein, as a result of an improved disctype clutch arrangement and the coordination thereof with the components of a conventional three forward-speed and single reverse-speed transmission, an additional higher reverse speed is made available in an efficient and economical manner.

While but one embodiment of the invention has been shown and described, other modifications thereof are possible.

I claim:

1. A transmission having three forward speeds and two reverse speeds; said transmission comprising an input shaft; an output shaft; torque converter means having an impeller, a turbine and a stator for providing a fluid drive, with an input to said impeller being operatively connected to and driven by said input shaft; first, second, and third simple identical planetary gear units interposed between said torque converter means and said output shaft, each of said planetary units including a sun gear, a ring gear, a carrier, and pinion gears rotatably mounted on said carrier and meshing with both said sun gear and said ring gear; said first carrier interconnecting said first pinion gear and said second ring gear; said second carrier interconnecting said second pinion gear and said output shaft; said third carrier interconnecting said third pinion gear and said output shaft; a sun gear; an intermediate shaft interconnecting said first and second sun gears; first, second, and third selectively operable brake means drivingly connected to said first, second and third ring gears, respectively, for preventing rotation of said first, second, and third ring gears; first selectively operable clutch means drivingly connected between said turbine and said first sun gear and cooperating with said second brake means for establishing a first forward speed ratio, with said first brake means for establishing a second forward speed ratio, and with said third brake means for establishing a first reverse speed ratio; and second selectively operable clutch means drivingly connected between said turbine and said first ring gear and cooperating with said first clutch means for establishing a third forward speed ratio, and with said second brake means for establishing a second reverse speed ratio.

2. A transmission having three forward speeds and two reverse speeds; said transmission comprising an input shaft; an output shaft; a torque converter having an impeller, a turbine and a stator for providing a fluid drive, with an input to said impeller being operatively connected to and driven by said input shaft; first, second, and third simple identical planetary gear units interposed between said torque converter and said output shaft, each of said planetary units including a sun gear, a ring gear, a carrier, and single-diameter axial pinion gears rotatably mounted on said carrier and meshing with both said sun gear and said ring gear; said first carrier interconnecting said first pinion gear and said second ring gear; and said second carrier interconnecting said second pinion gear and said output shaft; said third carrier interconnecting said third pinion gear and said output shaft; an intermediate shaft interconnecting said first and second sun gears; and a flange member interconnecting said second ring gear and said third sun gear; first, second and third brakes respectively operatively connected to said first, second, and third ring gears and operable to selectively lock said first, second, and third ring gears, respectively; first clutch means drivingly connected between said turbine and said first sun gear; and second clutch means drivingly connected between said turbine and said first ring gear; said first clutch means being selectively cooperable with said second clutch means and said first, second, and third brakes to produce three forward and one reverse speed ratios, and said second clutch means being selectively cooperable with said second brake to produce a second reverse speed ratio.

3. A transmission having a plurality of forward speeds and low and high reverse speeds; said transmission comprising an input shaft; an output shaft; a torque converter operatively connected to said input shaft; first, second and third planetary gear sets; second and third carrier members of said respective second and third gear sets being secured to said output shaft; second and third pinion gears of said respective second and third gear sets being rotatably mounted on said second and third carrier members, respectively; second and third ring gears and second and third sun gears of said respective second and third gear sets meshing with said second and third pinion gears, respectively; connector means for connecting said third sun gear to said second ring gear; a brake for grounding said second ring gear; the first carrier member of said first gear set being secured to said second ring gear; the first pinion gear of said first gear set being rotatably mounted on said first carrier member; the first sun gear of said first gear set being interconnected for rotation with said second sun gear and meshing with said first pinion gear; the first ring gear of said first gear set meshing with said first pinion gear; and a clutch for connecting said first ring gear to the output of said torque converter.

4. A multiratio transmission comprising an input shaft; an output shaft; a third shaft; a first clutch for selectively connecting said input shaft to said third shaft; first, second and third planetary gear sets, each including a sun gear, a ring gear, a carrier and a pinion gear rotatably mounted on each of said carriers and meshing with said respective sun and ring gears; the sun gears of said first and second planetary gear sets being secured for rotation with said third shaft; a second clutch for selectively connecting said input shaft to said first ring gear; first, second and third brakes for selectively grounding said first, second and third ring gears, respectively; said first carrier being secured to said second ring gear; said second and third carriers being secured to said output shaft; and a connector member interconnecting said second ring gear and said third sun gear.

5. A transmission having three forward speeds and two reverse speeds; said transmission comprising an input shaft; an output shaft; a torque converter unit operatively connected to said input shaft; first and second clutches operatively connected to said torque converter; first, second and third planetary gear units interposed between said clutches and said output shaft, each of said planetary gear units including a sun gear, a ring gear, a carrier, at least one pinion gear rotatably mounted on said carrier and meshing with said sun gear and said ring gear; said first carrier interconnecting said first pinion gear and said second ring gear; said second carrier interconnecting said second pinion gear and said output shaft; said third carrier interconnecting said third pinion gear and said output shaft; first, second and third brakes for selective engagement for locking said first, second and third ring gears, respectively; shaft means operatively connected between said first clutch and said first and second sun gears; a connector member operatively connected between said second clutch and said first ring gear; and a flange member interconnecting said second ring gear and said third sun gear.

* * * * *

PO-1050
(5/69)

UNITED STATES PATENT OFFICE
CERTIFICATE OF CORRECTION

Patent No. 3,793,909      Dated February 26, 1974

Inventor(s) Stanley W. Herman

It is certified that error appears in the above-identified patent and that said Letters Patent are hereby corrected as shown below:

Page 1, indented under the "Abstract", change "5 Claims" to -- 2 Claims --.

Col. 5, lines 3 and 28, change "$N_{18}/N_{38}$" to -- $N_{18}/N_{38}$ --;

line 28, change "$+1/\frac{2}{3}$" to -- $+1/-\frac{2}{3}$ --;

line 35, change "disctype" to -- disc-type --;

Claim 1, line 60, before "an" insert --
    a flange member interconnecting said
    second ring gear and said third sun gear; --.

Col. 6, lines 42-67, delete Claim 3 and the portion of

Claim 4.

Cols. 7 and 8, lines 1-10, delete the remaining portion of

Claim 4 and Claim 5 in its entirety.

Column 5, line 60, cancel "a sun gear"

Signed and sealed this 29th day of October 1974.

(SEAL)
Attest:

McCOY M. GIBSON JR.      C. MARSHALL DANN
Attesting Officer      Commissioner of Patents